(12) United States Patent
Poirot-Crouvezier

(10) Patent No.: US 11,923,576 B2
(45) Date of Patent: Mar. 5, 2024

(54) MULTIPLE INJECTION FUEL CELL AND OPERATING METHOD THEREOF

(71) Applicant: COMMISSARIAT A L'ENERGIE ATOMIQUE ET AUX ENERGIES ALTERNATIVES, Paris (FR)

(72) Inventor: Jean-Philippe Poirot-Crouvezier, St Georges de Commiers (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 224 days.

(21) Appl. No.: 17/228,149

(22) Filed: Apr. 12, 2021

(65) Prior Publication Data

US 2021/0234180 A1    Jul. 29, 2021

Related U.S. Application Data

(60) Division of application No. 15/193,431, filed on Jun. 27, 2016, now Pat. No. 11,094,951, which is a
(Continued)

(30) Foreign Application Priority Data

May 9, 2011  (FR) ...................................... 1153955
Jun. 25, 2015  (FR) ...................................... 1555883

(51) Int. Cl.
*H01M 8/04746* (2016.01)
*H01M 8/04089* (2016.01)
(Continued)

(52) U.S. Cl.
CPC ... *H01M 8/04753* (2013.01); *H01M 8/04089* (2013.01); *H01M 8/04179* (2013.01); *H01M 8/04761* (2013.01); *H01M 8/249* (2013.01)

(58) Field of Classification Search
CPC ......... H01M 8/04753; H01M 8/04089; H01M 8/04179; H01M 8/04761; H01M 8/249
See application file for complete search history.

(56) References Cited

U.S. PATENT DOCUMENTS

| 5,478,662 A | 12/1995 | Strasser |
| 7,354,670 B2 * | 4/2008 | Enjoji ............... H01M 8/04753 |
| | | 429/444 |

(Continued)

FOREIGN PATENT DOCUMENTS

| CN | 1914757 A | 2/2007 |
| CN | 102013505 A | 4/2011 |

(Continued)

OTHER PUBLICATIONS

Office Action in Chinese Patent Application No. 201280028196.4, dated Jul. 28, 2015.

*Primary Examiner* — Matthew J Merkling
(74) *Attorney, Agent, or Firm* — BakerHostetler

(57) ABSTRACT

Fuel cell batteries are provided, and in particular hydrogen fuel cell batteries composed of at least one stack of cells. The battery is divided into at least two groups of cells able to be supplied with hydrogen separately. In a first phase, only the first group of cells and not the second is supplied; unconsumed hydrogen may however flow between the two groups via at least one evacuation manifold connected to the cells of the two groups. In a second phase, the supply to the two groups is reversed, unconsumed hydrogen still being able to flow between the two groups via the evacuation manifold. In a third phase, after a series of alternations of the two first phases, the two groups are first simultaneously supplied, then a purge valve of the evacuation manifold is opened then closed.

13 Claims, 4 Drawing Sheets

Related U.S. Application Data continuation-in-part of application No. 14/116,725, filed as application No. PCT/EP2012/058012 on May 2, 2012, now abandoned.

(51) Int. Cl.
*H01M 8/04119* (2016.01)
*H01M 8/249* (2016.01)

(56) References Cited

U.S. PATENT DOCUMENTS

| | | | |
|---|---|---|---|
| 7,858,258 B2* | 12/2010 | Logan | H01M 8/0441 |
| | | | 429/445 |
| 8,007,943 B2* | 8/2011 | Senner | H01M 8/04097 |
| | | | 429/408 |
| 2003/0207165 A1 | 11/2003 | Skala et al. | |
| 2004/0166383 A1 | 8/2004 | Schafer | |
| 2005/0164069 A1 | 7/2005 | Margiott et al. | |
| 2006/0234093 A1 | 10/2006 | Schaefer et al. | |
| 2008/0026264 A1 | 1/2008 | Watanabe | |
| 2014/0072896 A1 | 3/2014 | Poirot-Crouvezier | |

FOREIGN PATENT DOCUMENTS

| | | |
|---|---|---|
| EP | 0 596 366 A1 | 5/1994 |
| EP | 1 587 157 A2 | 10/2005 |
| EP | 1 746 678 A1 | 1/2007 |
| FR | 2 975 227 A1 | 11/2012 |
| JP | 62-150664 A | 7/1987 |
| KR | 10-2011-0045113 A | 5/2011 |

\* cited by examiner

MULTIPLE INJECTION FUEL CELL AND OPERATING METHOD THEREOF

CROSS-REFERENCE TO RELATED APPLICATIONS

This application is a divisional of pending U.S. application Ser. No. 15/193,431, filed Jun. 27, 2016, which is a continuation-in-part of U.S. application Ser. No. 14/116,725, filed on Nov. 14, 2013 and now abandoned, which is a National Stage of International patent application PCT/EP2012/058012, filed on May 2, 2012 and now expired, which claims priority to foreign French patent application No. FR 1153955, filed on May 9, 2011. This application claims priority to foreign French patent application No. FR 1555883, filed on Jun. 25, 2015. The disclosures of each of the above-noted applications are incorporated by reference in their entireties.

FIELD OF THE INVENTION

The invention relates to fuel cell batteries, and in particular hydrogen fuel cell batteries.

BACKGROUND

A fuel cell battery is a stack of elementary cells in which an electrochemical reaction takes place between reactants that are gradually introduced as the reaction consumes them. The fuel, which is hydrogen in the case of a hydrogen fuel cell battery, is brought into contact with the anode; the oxidant, oxygen or air for a hydrogen fuel cell battery, is brought into contact with the cathode. The anode and cathode are separated by an electrolyte, possibly a solid membrane, that is permeable to certain of the constituents of the reaction but not all. The reaction is subdivided into two half reactions (an oxidation and a reduction), which take place, on the one hand, at the anode/electrolyte interface, and on the other hand, at the cathode/electrolyte interface. In practice, the solid electrolyte is a membrane that is permeable to hydrogen ions $H^+$ but not to molecular dihydrogen $H_2$ or electrons. The reduction reaction at the anode is oxidation of hydrogen producing $H^+$ ions, which pass through the membrane, and electrons, which are collected by the anode; at the cathode these ions participate in the reduction of oxygen, requiring electrons and producing water, heat also being given off.

The stack of cells is only the location of the reaction: the reactants must be supplied thereto, and products and non-reactive species must be evacuated therefrom, just like the heat produced. Lastly, the cells are connected in series to one another, the anode of one cell being connected to the cathode of the adjacent cell; at the ends of the stack of cells, on one side an anode is connected to a negative terminal in order to evacuate electrons, and on another side a cathode is connected to a positive terminal. An external circuit is connected to these terminals. Electrons flow from the anode to the cathode via the external circuit thus powered by the battery as the electrochemical reaction progresses.

A fuel cell battery may be divided into a plurality of stacks each having electrical terminals and interfaces for the supply of reactive fluids and coolants; these subassemblies are then connected in parallel or in series, from the fluidic point of view and from an electrical point of view. With respect to the fluidic connection a parallel connection is by far that which is most frequently encountered.

In systems using hydrogen and atmospheric air as reactants, compressed air is delivered to the battery and passes through a series of components (filter, heat exchanger, humidifier, etc.) before penetrating into the battery on the cathode side. At the cathode outlet, the air is generally dried in order to recover the water necessary for the humidification, then most often evacuated via a back-pressure regulator (i.e. a regulator of upstream pressure) allowing the pressure of the line to be maintained. On the anode side, the hydrogen may be obtained from a large number of different sources, for example a pressurized tank allowing recourse to a device for compressing the gas to be avoided. It is therefore most often delivered to the battery after having passed through a simple pressure reducing valve or a solenoid valve applying the expected pressure in the line. Most of these possible sources deliver dry hydrogen.

At the battery outlet, a number of scenarios are possible: hydrogen injected into the battery and not consumed by the reaction may in part be reinjected at the battery inlet together with dry hydrogen originating from the source, in order to homogenize the mixture in the battery i.e. in order to mix it with the reaction products and non-reactive species present (notably nitrogen, coming from the cathode via permeation through the membrane) which do not participate in the reaction and on the contrary tend to inhibit it; this recirculation in addition makes it possible to maintain a certain humidification of the hydrogen that reaches the cells; specifically, in the reaction products, there is water vapor mixed with unconsumed hydrogen, and this water vapor is recirculated with the hydrogen; humidification is desirable in order to make the hydrogen less aggressive with respect to the electrolytic membrane. However, the recirculation systems that enable this reinjection are complex and expensive.

Alternatively, the cells can be purged at regular intervals in order to evacuate the products of the reaction, and notably nitrogen. However, it is not possible to wait until there is too much nitrogen in the cells before purging because the electrochemical reaction would stop. Purging of products that have become a hindrance cannot take place without, at the same time, purging a certain amount of hydrogen; this is a disadvantageous loss because of the cost of the hydrogen, and it is desirable to minimize the amount of hydrogen thus purged.

SUMMARY OF THE INVENTION

One of the aims of the invention is to provide a system that reduces losses of reactant (notably hydrogen) during purges, without however requiring a complex recirculation system.

According to the invention, a fuel cell battery is provided producing electrical power via an electrochemical reaction between at least two reactants, the battery comprising at least one stack of cells each of which is composed of an assembly of an electrolyte, an anode, and a cathode, the stack being provided with a means for supplying at least one of the reactants, this means being able to deliver this reactant to the cells of the stack, and a means for evacuating sub-products of the reaction, characterized in that:
  the cells of the battery are divided into N groups, N being an integer >1, and the means for supplying the reactant comprises a respective supply manifold for supplying each group of cells, this manifold being able to deliver the reactant selectively to the cells of a group without delivering it to the cells of the other groups, the supplying means comprises a selective switching means for permitting and preventing the passage of the reactant to each of the manifolds, the evacuating means comprises one or more evacuation manifolds, it is arranged in order to permit reactant not consumed by the reaction to flow between the N groups of cells, and it comprises a purge valve.

The cells of the various groups are preferably stacked in an interleaved way, which is to say that a cell of one group is adjacent a cell of another group in one and the same stack. It is also possible to envisage, but this configuration would be less advantageous because it is less compact, for the battery to be formed from a plurality of stacks each corresponding to a respective group of cells.

The evacuation manifold, passing through the stack of cells, is preferably common, i.e. the cells of all the groups communicate directly with this manifold; however, separate manifolds could also be provided for each group; they would then be connected to the outlet of the stack in order to ensure free flow from one group to the other.

The supplying means may supply hydrogen to the supply manifolds of the N groups, the manifold of a group communicating with the cells of this group from the anode side. However, provision may also be made for the supplying means to supply oxygen to the supply manifolds of the N groups, the manifold of a group communicating with the cells of this group from the cathode side.

Correspondingly, the invention provides a method for operating a fuel cell battery, which may be implemented with such a battery structure.

The method is a method for supplying a stack of cells of a fuel cell battery with at least one reactant, which is characterized in that N groups of cells of the stack are selectively supplied with the reactant in at least three phases, a first phase in which a first group of cells is supplied but not a second group, the unconsumed reactant being able however to flow between the two groups via at least one evacuation manifold connected to the cells of the two groups;

a second phase in which the second group is supplied but not the first, the unconsumed reactant being able however to flow between the two groups via the evacuation manifold; and a third, purging, phase in which the two groups are first supplied simultaneously, then a purge valve of the evacuation manifold is opened then closed.

The two first phases are preferably repeated in a plurality of successive alternations before the third phase is passed to, after which a cycle restarts.

If the number N is greater than two, the principle remains the same, but a third group, a fourth group, etc. are provided in the battery, and complementary phases are inserted in the process. Either a single group is supplied during a phase or a plurality (but not all) of the groups are supplied by modifying the composition of the groups supplied in each phase in a series of successive phases with a gradual permutation of the supplies. Next, a purge phase is carried out, which comprises simultaneously opening all the supplies, immediately followed by a common purge (opening then closing of the purge valve).

Because it is possible to make unconsumed reactant flow from one group of cells to another via the one or more evacuation manifolds, it is possible to reduce hydrogen consumption by purging the battery less often; specifically, certain groups of cells, but not all of them, are supplied simultaneously, the reaction continuing in the one or more groups that are not directly supplied; the risk of saturation of reaction products, which would tend to stop the electrochemical reaction by creating, locally, a shortage of reactant, is reduced by the mixing of reaction products achieved by the successive changes of supply, and by the fact that the reactant not consumed in a supplied group reaches the one or more unsupplied groups via the evacuation manifold, and mixes with the reaction products, allowing the reaction to continue. For example, in a hydrogen fuel cell battery using air as an oxidant, and generating nitrogen at the anode via permeation through the membrane, cells that have their main supply of hydrogen cut risk becoming saturated with nitrogen, but hydrogen not consumed by a group of (supplied) cells reaches the other (unsupplied) group via the one or more evacuation manifolds of the two groups. Mixing of the nitrogen resulting from the reaction in the cells of the unsupplied group takes place because of the change of supply, and this mixing is facilitated by the open connection between the outlets of the two groups. Even though this mixing supplies only a small percentage of hydrogen to the nitrogen saturated zones, the mixing and this small percentage are sufficient to sustain a correct reaction.

In addition, the hydrogen thus recovered is charged with moisture and introduces this moisture into the unsupplied group so that when this group is once more supplied the electrolytic membranes remain in the presence of a mixture of moist and dry hydrogen. This moisture has a beneficial effect on the lifetime of the membranes.

BRIEF DESCRIPTION OF THE DRAWINGS

Other features and advantages of the invention will become apparent on reading the following detailed description that is given with reference to the appended drawings in which.

DETAILED DESCRIPTION

The invention will be described with regard to a hydrogen fuel cell battery supplied on the anode side with hydrogen and on the cathode side with air, the implementation of the method being applied here to the hydrogen, i.e. to the anode side. The invention is also applicable to the cathode side, i.e. to the supply of oxidant, when the latter consists mainly of oxygen (content higher than 50% in the dry gas). Lastly, the invention is mainly applicable to hydrogen fuel cell batteries but it is also applicable to other reactants, whether on the side of the supply of oxidant or on the side of the supply of fuel.

The hydrogen fuel cell battery comprises multiple cells each comprising an anode, a cathode and an electrolyte between the anode and cathode. Here, only the case where the electrolyte consists of an ion exchange membrane will be considered. In practice, many cells are stacked to form one or more stacks that are connected together from a fluidic and electrical point of view.

A means for supplying the cells with pressurized hydrogen is provided. It comprises means for distributing hydrogen in the interior of each cell on the anode side. Likewise, a means for supplying air is provided, with means for distributing air in each cell on the cathode side. Again likewise, a means for evacuating the products of the reaction (nitrogen, water and notably liquid water) is provided, this means being distributed in order to gather and evacuate the reaction products from all the cells. Here, attention will only be given to the evacuation of reaction products and inert species from the anode side, in particular the water and the nitrogen that initially appear on the cathode side but that are passed to the anode side through the electrolytic membrane. Finally, cooling means distributed over all the cells may also be provided for fuel cell batteries that require such cooling.

Figure 1:
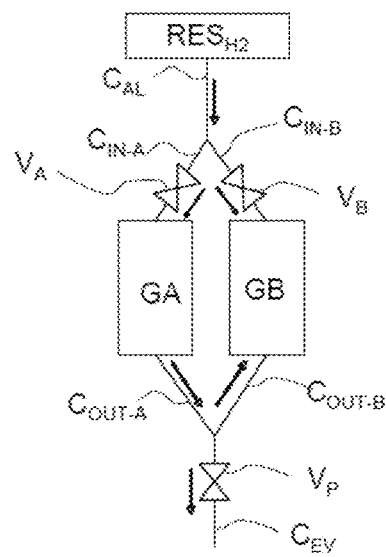
FIG. 1 schematically shows the principle of the architecture of a fuel cell battery according to the invention.

FIG. 1 shows, very schematically, two groups of cells: group GA and group GB, with an upstream part (upstream of the stack of cells) of the means for supplying hydrogen, and a downstream part (downstream of the stack of cells) of the evacuating means. The other elements described above are not shown.

The two groups of cells are identical but are supplied separately. The upstream part of the supplying means therefore comprises:
  a tank $RES_{H2}$ of pressurized hydrogen (or any other means for delivering pressurized hydrogen);
  a main general supply duct $C_{AL}$ for supplying the battery, which duct delivers hydrogen from the tank;
  two secondary inlet ducts $C_{IN-A}$ and $C_{IN-B}$ that deliver hydrogen from the general duct $C_{AL}$ to each of the two groups of cells; the battery comprises, downstream of these secondary ducts, a respective supply manifold for each group; this manifold passes through the stack of cells and distributes the hydrogen in the cells; it is not shown in FIG. 1; and
  switching valves, on the path of the hydrogen from the general duct, for directing the hydrogen either toward the supply manifold of the group GA or toward the supply manifold of the group GB or toward both at the same time; two separate valves $V_A$ and $V_B$ have been shown, each placed in a respective secondary duct, but it will be understood that a single three-position valve, placed at the junction between the main duct and the secondary ducts, could be used.

FIG. 1 shows, for the sake of comprehensibility, the two groups of cells one beside the other; in fact, the cells are all stacked and the groups of cells will be interleaved with one another in the stack: the stack will comprise a regular alternation of cells of group A and cells of group B, a cell of one group preferably always being adjacent a cell of the other group.

In order to evacuate the products of the reaction from the anode side, one or two evacuation manifolds (not shown) are provided, which manifolds pass through the stack of cells and gather, from each cell, the products generated by the reaction at the anode. Downstream of this manifold, the evacuating means may comprise one or two outlet ducts $C_{OUT-A}$ and $C_{OUT-B}$ (depending on whether there are one or two evacuation manifolds) which join a main evacuation duct $C_{EV}$. A purge valve $V_P$ is provided in the main duct $C_{EV}$.

It serves to purge nitrogen and water coming from the two groups of cells at the same time, i.e. the groups are not each purged separately.

To simplify the diagram and the explanation, FIG. 1 shows the cells of the two groups having separate manifolds, but in practice there will preferably be a single manifold connected to all the cells of the two interleaved groups.

Figure 2:
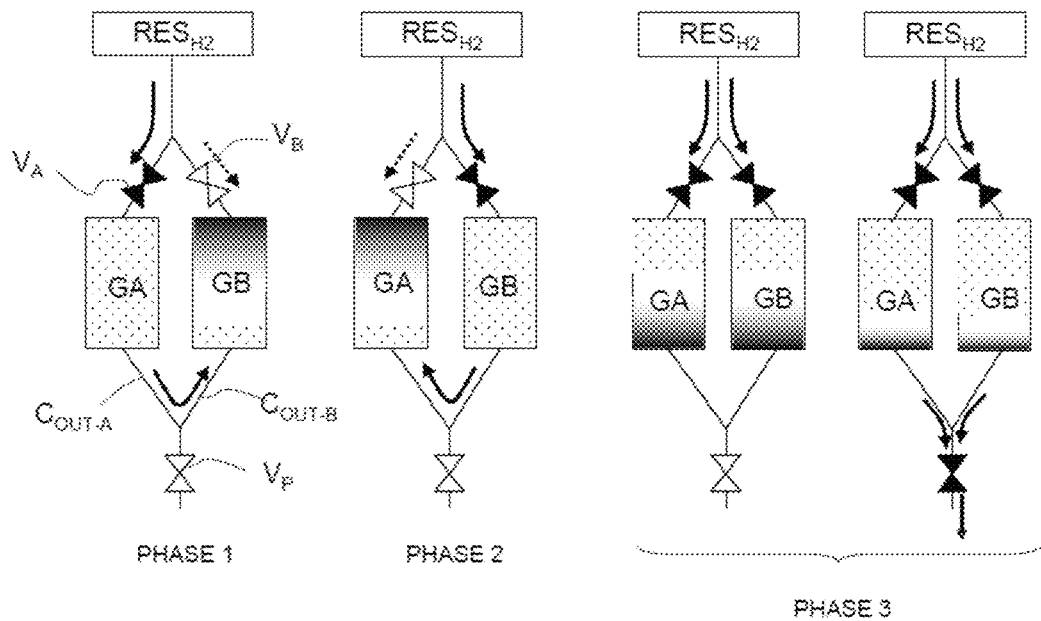
FIG. 2 shows the three operating phases of the battery in one implementation of the method according to the invention.

FIG. 2 shows the main operating phases of the battery, with the same very simplified drawing of FIG. 1.

In a first phase, the valve $V_A$ is open, the valve $V_B$ is closed, and the valve $V_P$ is closed; the group GA of cells is supplied with pressurized dry hydrogen via the valve $V_A$; the pressure pushes the reaction products, i.e. nitrogen, liquid water, and water vapor, but also hydrogen not consumed by the reaction before the valve $V_A$ was opened, toward the outlet duct $C_{OUT-A}$. This (moist) hydrogen reaches the group GB via the duct $C_{OUT-B}$, which communicates freely with the duct $C_{OUT-A}$ (or directly via the evacuation manifold common to the two groups if it exists); the moist hydrogen mixes with the products of the reaction that continues in the group GB not supplied with dry hydrogen. This mixing with a supply of hydrogen prevents local saturation of the reaction zone with too high a concentration of nitrogen; the electrochemical reaction may therefore continue during this phase despite the absence of a supply of dry hydrogen.

In the second phase, the situation is quite simply reversed, the valve $V_A$ is closed and the valve $V_B$ is opened. The valve $V_P$ remains closed. The flow of reaction products and of unconsumed hydrogen reverses and passes from the duct $C_{OUT-B}$ to the duct $C_{OUT-A}$.

These two phases may be followed by a third phase, or indeed be alternated X times before a third phase is carried out. During this alternation, the volume of accumulated nitrogen is moved from one group of cells to the other through the outlet ducts or via the common evacuation manifold. This mixing allows nitrogen stratification or local accumulation of nitrogen, which is continuously produced but not evacuated until the purge valve is opened, to be limited. In the absence of this mixing it would be necessary to purge often; with this mixing it is possible to purge less often.

The third phase is therefore a purging phase for simultaneously evacuating reaction products and notably nitrogen from the two groups of cells. The admission valves $V_A$ and $V_B$ are opened together, then the purge valve $V_P$ is also opened, then closed.

The frequency at which the purging phase is carried out (X times lower than the frequency of the alternations in the supply of groups GA and GB) may be:
  a fixed preset frequency;
  a frequency set relative to the frequency of alternation of the two first phases (which itself may be fixed or variable);
  a frequency varying as a function of battery operating parameters, for example current delivered or temperature; or
  a frequency varying as a function of a delivered voltage threshold level, this threshold possibly itself varying as a function of the operating parameters of the battery.

The frequency of the alternation of the two first phases may either be set experimentally or in situ by detecting parameters such as the output voltage across the terminals of the cells: a voltage drop indicates that the reaction is slowing and therefore the usefulness of then switching the supply of the groups if this drop exceeds a tolerable threshold (for example a few tens of millivolts).

The same principle may be applied to more than two groups of cells supplied separately with hydrogen and having their evacuation outlets in communication with one other.

For example, there may be three groups and their supply may be changed in a three phase circular permutation that may be repeated X times before a fourth common purge phase:
phase 1: a group GA supplied, two groups GB and GC not supplied;
phase 2: a group GB supplied, two groups GC and GA not supplied;
phase 3: a group GC supplied, two groups GA and GB not supplied; and
phase 4, after X series of three permutations: Groups GA, GB and GC are supplied, and then the purge valve is opened then closed.

It is also possible to make provision for two groups to be supplied simultaneously, only one not being supplied.

If the number N of groups is increased above three, many other combinations are possible. For example, with four groups GA, GB, GC, GD, having outlets connected with a common purge valve, a four phase circular permutation could be used in which two groups are supplied simultaneously and two others are not supplied:
phase 1: two groups GA, GB supplied, two groups GC, GD not supplied;
phase 2: two groups GB, GC supplied, two groups GD, GA not supplied;
phase 3: two groups GC, GD supplied, two groups GA and GB not supplied;
phase 4: two groups GD, GA supplied, two groups GB, GC not supplied; and
phase 5, after X series of four permutations: Groups GA, GB, GC and GD are supplied, and then the purge valve is opened then closed.

Better mixing of the nitrogen is then assured, the nitrogen being transferred more frequently from one group of cells to another.

The method steps thus described are particularly advantageous when the hydrogen fuel cell battery functions with air as an oxidant since they make it possible to avoid drawbacks due to nitrogen. However, even if the oxidant does not contain nitrogen, the mixing that results from this method is advantageous for limiting drying of the membrane at the inlet of the fuel cell battery, on the anode side.

To implement the invention, the departure point is a conventional arrangement of stacked cells, but this arrangement is adapted in order to include therein distributing means capable of distributing the reactant, for example hydrogen, to certain cells but not to others.

Conventional fuel cell batteries comprising stacked cells comprise a superposition of what are called bipolar plates, between which are placed assemblies comprising, at the same time, an electrolytic membrane and an electrode on each side of the membrane. The bipolar plates, optionally associated with seals having a particular configuration, serve to collect electrical current and to distribute the reactant gases (hydrogen and air, or hydrogen and oxygen) to the membrane, on the appropriate side of the membrane: hydrogen on the anode side, air or oxygen on the cathode side. They comprise distribution channels facing the anodes and others facing the cathodes. On their periphery, the plates are pierced with apertures serving to deliver the reactant gases, and apertures serving to evacuate the products of the reaction. The apertures for delivering reactant gas form, via the superposition of plates in intimate contact with one another, manifolds for supplying reactant gas. The evacuation apertures form, in the same way, manifolds for evacuating the products of the reaction. Seals are provided so that the fluids remain confined in these manifolds, but the design of the bipolar plates and/or the seals is such that passages are formed in the manifolds in the locations where it is desired to distribute the fluid to a cell so that the fluid penetrates into this cell, on the desired side, without crossing to the other side. These passages direct the reactant gases to the cell via distribution channels formed in the plates, which distribute the gas as uniformly as possible over the electrolytic membrane.

The same applies to the reaction products, the plates and seals being designed in order to allow the reaction products to be gathered and evacuated, on the anode side and/or the cathode side, to the evacuation manifold.

Thus, the supply manifold for supplying a conventional cell with hydrogen consists of a stack of plates and seals designed such that the hydrogen can spread in the cells on the anode side, but absolutely not on the cathode side. The opposite is true for the supply manifold supplying air or oxygen.

At the end of the stack these apertures formed in the plates are respectively connected to a respective supply duct for supplying each reactant and an evacuation duct for evacuating the products of the reaction.

According to the invention, this structure is modified by drilling the plates with N supply manifolds (N being an integer at least equal to 2) for supplying the reactant for which it is desired to implement the invention, here N hydrogen supply manifolds are provided. Therefore, instead of designing the plates and seals with stacked apertures so that the hydrogen can penetrate into the supply manifold on the anode side of all the cells of the stack, provision is made:
for the plates and seals each to comprise N series of stacked apertures (N>1) instead of a single series, in order to form N supply manifolds instead of one, each manifold supplying a respective group of cells; and
for the plates and seals of the stack to have N different designs as regards the passages, allowing a gas to pass between a manifold of one series and a cell, so that the stacked apertures of a series supply the cells of the corresponding group but not the cells of the other groups.

Preferably, the cells are regularly alternated, i.e. two adjacent cells belong to different groups.

Therefore, the groups are differentiated by the fact that a cell belonging to one group is in communication with the supply manifold of this group but not in communication with the other supply manifolds that pass through it.

At the end of the stack, the apertures forming a respective hydrogen supply manifold are connected to respective supply ducts ($C_{IN-A}$, $C_{IN-B}$). There are N supply manifolds respectively connected to one of N ducts. Furthermore, valves such as $V_A$, $V_B$ are provided in order to permit or prevent the injection of hydrogen into a respective duct, and therefore into a series of respective apertures forming a supply manifold.

As regards the apertures corresponding to the evacuation manifold (attention will be given only to the manifold of the anode reaction products, but the cathode may also be provided with a manifold), two possibilities may be envisioned:
either there is a single evacuation manifold formed by apertures in the superposed bipolar plates, this manifold communicating with all the cells whatever the group to which the cells belong; the cells may then directly communicate with one another via the evacuation manifold;

or a plurality of evacuation manifolds are provided (not necessarily N) configured as the supply manifolds, i.e. connected to certain cells but not others; in this case these manifolds are connected, at the end of the stack, to a plurality of evacuation ducts, as shown for the sake of simplicity in FIGS. 1 and 2: ducts $C_{OUT-A}$, $C_{OUT-B}$.

Figure 3:
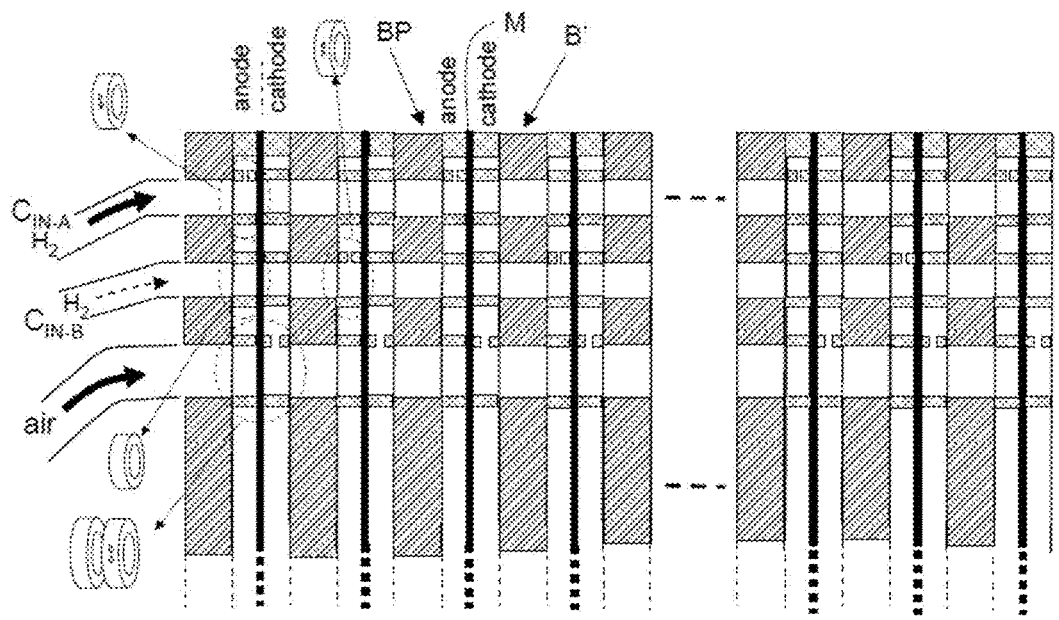
FIG. 3 shows a stack of cells belonging to two groups able to be supplied separately, in which the groups of cells are interleaved, two adjacent cells belonging to two different groups.

FIG. 3 shows a cross section through an example stack of a plurality of cells in a battery according to the invention. The cells are each composed of a central electrolytic membrane M, between two bipolar plates BP and BP'. For each membrane, the anode is on the left and the cathode is on the right. The plates shown are flat in order to simplify the drawing and only plate portions containing the supply manifolds, for supplying air and hydrogen (in principle at the periphery of the plates), have been shown. The evacuation manifolds are not shown. They may take the same form as the air supply manifolds. Cooling manifolds, which may optionally be present, have also not been shown.

Seals, notably completely impermeable peripheral seals, separate the membrane from each plate.

In the drawing in FIG. 3, the communication or lack of communication between an evacuation manifold and the cells is considered to be controlled by seals, for example ring joints, encircling the apertures in the location of the cell and on the (anode or cathode) side in question. A seal that continually encircles an aperture i.e. one that does not contain a communication aperture, prevents communication. An injector seal comprising communication apertures enables this communication.

It will be understood that the communication may be prevented or permitted by means other than these ring joints, for example seals of complex shape, or bipolar plates with particular designs.

If FIG. 3 is considered, it may be seen that the hydrogen supply manifold that is supplied by the duct $C_{IN-A}$ is in communication with one cell in two on the anode side and never in communication with the cathode side. It may also be seen that the other supply manifold, supplied by the duct $C_{IN-B}$, is in communication with the other cells on the anode side and never in communication with the cathode side. The air supply manifold is in communication with all the cells on the cathode side, but never on the anode side.

Figure 4:
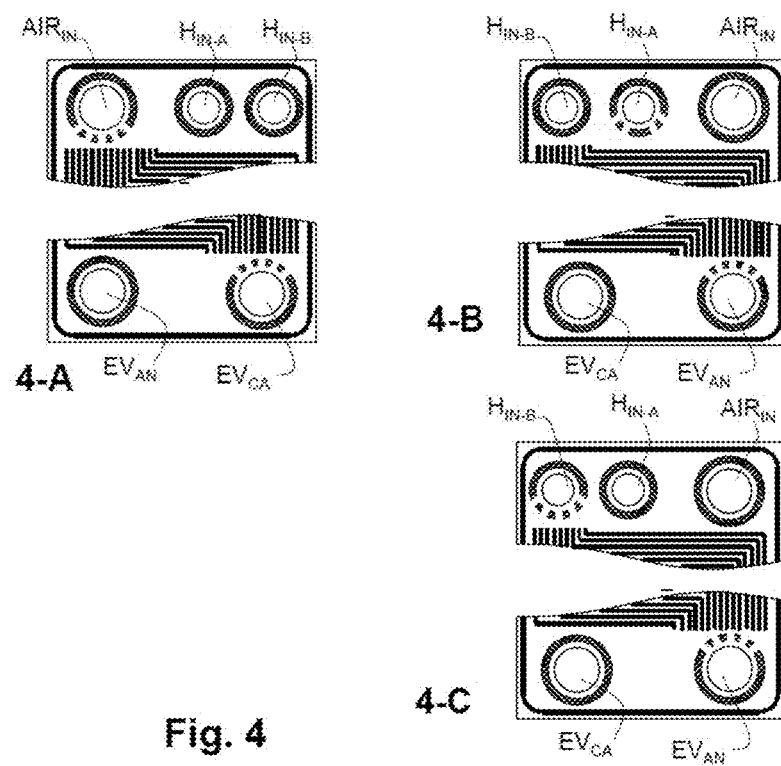
FIG. 4 shows a schematic view of bipolar plates, in three different planes for the plates of stacked cells: the plane of the cells on the cathode side, the plane of a cell of a first group on the anode side, and the plane of a cell of a second group on the anode side.

FIG. 4 shows three views of bipolar plates again showing the arrangement with two hydrogen supply manifolds, each of the manifolds communicating with the cell of one group but not with that of the other group. In this example, there is one hydrogen supply manifold $H_{IN-A}$ for the cells of group A, another $H_{IN-B}$ for the cells of group B, an air supply manifold $AIR_{IN}$ for all the cells, an evacuation manifold $EV_{AN}$ for the anode-side products, and an evacuation manifold $EV_{CA}$ for the cathode-side products.

The first view 4-A shows the front of the cathode-side bipolar plate, with:
an aperture representing the manifold $AIR_{IN}$ and a seal provided with communication apertures;
two apertures representing the manifolds $H_{IN-A}$ and $H_{IN-B}$ with seals without apertures, communication therefore being prevented;
an aperture representing the evacuation manifold $EV_{CA}$ for the cathode-side reaction products, with a seal drilled with apertures; and
an aperture representing the evacuation manifold $EV_{AN}$ for the anode-side reaction products, with a seal without apertures.

The second view 4-B shows the front of an anode-side bipolar plate of a cell of group GA, with:
an aperture representing the manifold $AIR_{IN}$ and a seal that contains no communication apertures;
an aperture representing the manifold $H_{IN-A}$ with a seal provided with communication apertures;
an aperture representing the manifold $H_{IN-B}$ with a seal that does not contain communication apertures;
an aperture representing the evacuation manifold $EV_{AN}$ for the anode reaction products, with a seal drilled with apertures; and
an aperture representing the evacuation manifold $EV_{CA}$ for the cathode reaction products, with a seal without apertures.

The third view 4-C shows the front of an anode-side bipolar plate of a cell of group GB, with:
an aperture representing the manifold $AIR_{IN}$ and a seal that contains no communication apertures;
an aperture representing the manifold $H_{IN-A}$ with a seal that does not contain communication apertures;
an aperture representing the manifold $H_{IN-B}$ with a seal provided with communication apertures;
an aperture representing the evacuation manifold $EV_{AN}$ for the anode reaction products, with a seal drilled with apertures; and
an aperture representing the evacuation manifold $EV_{CA}$ for the cathode reaction products, with a seal without apertures.

To ensure selective distribution, or selective supply, of hydrogen in one or other of the manifolds, the length of secondary ducts, such as $C_{INA}$ and $C_{INB}$, may be minimized. Specifically, it is possible to produce a means for directing the gas in a terminal plate of the stack. These means may be valves but also, more simply, switchable shutters, or even perforated plates that are mounted to be rotatably or translatably moveable, in order to bring an aperture in the plate into communication with the duct to be supplied with minimum power consumption.

In some embodiments, a fuel cell battery, including at least the anode side and/or the cathode side of the fuel cell battery, is supplied with reactants with a stoichiometric ratio of about 1, that is to say equal, more or less 1% to 10%. The anode side of a fuel cell can be supplied with hydrogen with a stoichiometric ratio of about 1, the cathode side can be supplied with atmospheric air. An embodiment of the invention relates to the cathode side supplied with substantially pure oxygen with a stoichiometric ratio of about 1. The invention relates to any type of fuel cell, particularly those operating at low temperature, that is to say at a temperature below 200° C.

Figure 5:
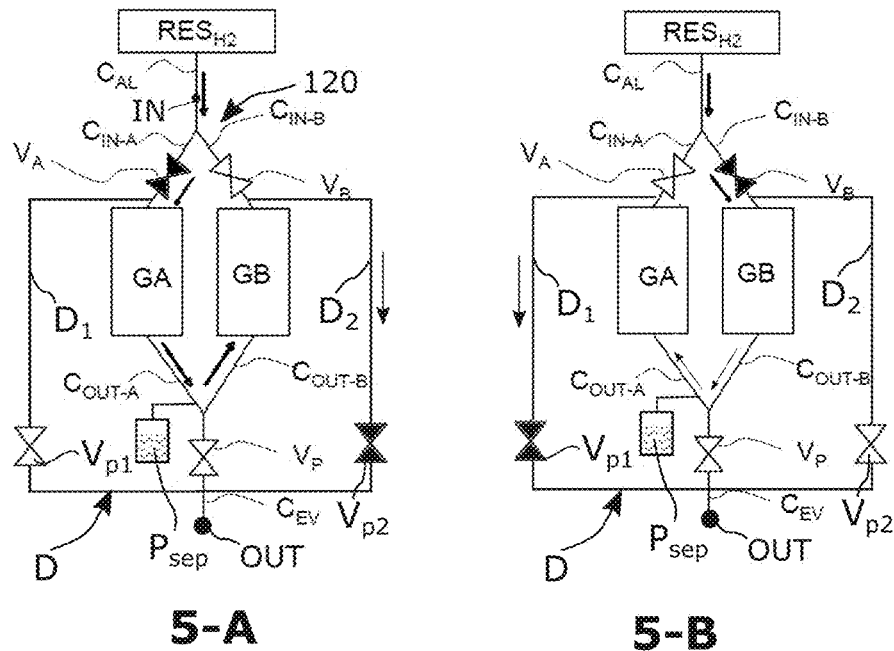
FIG. 5 schematically illustrates a fuel cell battery comprising two groups of cells according and FIG. 6 illustrates a part of a fuel cell battery having three groups of cells.
Figure 5:
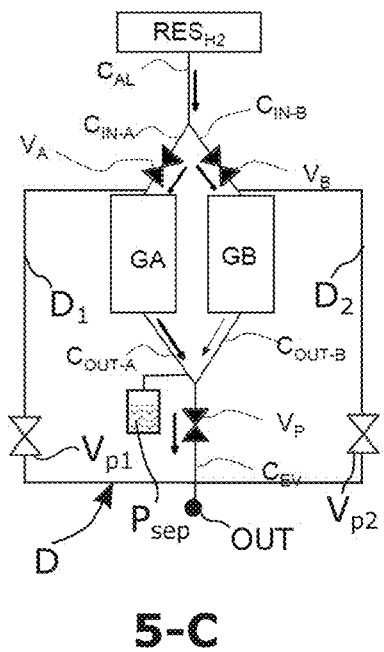

FIG. 5 schematically illustrates a fuel cell battery comprising two groups of cells according to an embodiment of the invention, for two successive supply steps illustrated in FIGS. 5-a and 5-b, and an optional step of purging illustrated in FIG. 5-c.

FIG. 5-a schematically illustrates a fuel cell battery which comprises a stack of electrochemical cells divided into two separate groups GA and GB of electrochemical cells. The cells are preferably identical to each other. The cells of the different groups of the same stack can be arranged in an interleaved way, so that a cell of a group is adjacent to a cell of another group. More generally, it is meant by a "first group" that a group of cells is directly supplied by reactants, i.e. the fuel cell is arranged so that the fluid path do not flow in other groups before the first group. It is meant by last group(s) all the other group but the first group. In the embodiment illustrated in FIG. 5-a, a last group is fluidly connected in series to the first group. More generally, last groups are fluidly connected in parallel together and in series with a first group. In the embodiment illustrated in FIG. 5-a, GA corresponds to the first group and GB corresponds to the last group.

The fuel cell battery comprises an inlet IN for supplying reactants and an outlet orifice OUT permitting the fluid evacuation from the fuel cell battery. In this example, the anode of the cells is supplied with hydrogen and the cathode is supplied with atmospheric air containing oxygen. The fluid comprising the reactants, injected at the inlet IN is called a supplying fluid and have a stoichiometry in reactants of about 1: in other words, the amount of reactants injected substantially corresponds to the amount of reactants consumed.

This inlet IN of the fuel cell battery is connected, that is to say fluidly connected, to the supply ducts $C_{IN-A}$, $C_{IN-B}$ of each group. In other words, fluid flow is possible between the inlet IN and each supply duct $C_{IN-A}$, $C_{IN-B}$. By selective supply, it is meant the general and secondary ducts are used to supply directly one or more groups in supplying fluid, and not the others, supplied groups being different from one phase of supply to the other. It is meant by "groups of cells supplied", or "supplied directly" that the supply manifold of a group is fluidly connected to the inlet IN and the supply fluid is introduced into the considered group, without passing first through another group of cells. Furthermore, "fluid path" defines the fluid circulation path traveled by the supplying fluid from a first group to one or more last groups, or more generally from the inlet IN to the outlet OUT of the fuel cell battery.

The fuel cell battery also comprises an evacuation means adapted to provide fluid communication between groups. In this example, the fluid evacuation manifold $C_s$ is arranged so that the fluid circulating in a group may flow toward the second.

The fuel cell battery comprises a drain system D, said drain system comprising at least a drain channel $D_1$, $D_2$. It also comprises an outlet OUT arranged downstream the purge valve $V_P$ of the evacuation manifold (or common evacuation manifold). A drain channel is arranged to permit a flow between one said supply manifold and the outlet OUT. The drain system D is adapted to allow the continuous evacuation of a fluid present in a last group GB, to the outlet OUT. In this example, the drain system D connects each manifold input $C_{IN-A}$, $C_{IN-B}$ to the outlet OUT. It comprises two drain channels $D_1$, $D_2$ each comprising a valve $V_{p1}$, $V_{p2}$ whose opening can be controlled according to a representative value of the fluid flow of a reactant in the said drain channel, as, for example, the molar flow rate of a reactant in the drain channel $D_1$, $D_2$. A representative value of the fluid flow in a drain channel can be measured with a flow sensor embedded in a drain channel $D_1$, $D_2$. The valve $V_{p1}$, $V_{p2}$ are adapted to permit, prevent or limit the fluid flow through it, i.e. through a drain channel.

The different phases of supply and purge are now described with reference to FIGS. 5-a to 5-c.

Referring to FIG. 5-a, a first supply phase consists in supplying a first group, group GA here, but not the other group, in this example group GB. The valve $V_A$ is opened and the valve $V_B$ is closed, so that the supply fluid flows from the inlet IN to the supply manifold $C_{IN-A}$ of group A. To prevent the supply fluid from flowing into the drain channel $D_1$ of the drain system D, the valve $V_{p1}$ is closed.

The supply fluid thus flows in the electrochemical cells of group GA from the supply manifold $C_{IN-A}$ to the common evacuation manifold Cs. The purge valve $V_p$ being closed, the fluid flows into the group GB, which form the last group of the fluid path. Thus, the group B is not directly supplied in supply fluid from the inlet IN, but receives the fluid through the first group GA.

Insofar as the hydrogen stoichiometry ratio is close to 1 for all groups of the fuel cell battery, this ratio becomes much higher than 1 for group GA, for example greater than 1.2, and very close to 1 for group GB, for example less than 1.1. Thus, the flow rate at the outlet of group GA is relatively large, for example of the order of 50% of the fuel cell battery inlet flow rate, and allows to evacuate, out of the group GA, the liquid water and nitrogen present in the cells in group GA. In group GB, the fluid flow rate decreases towards the end of the fluid path, to a value in the range, for example, of 5% or less of flow rate at the input IN. Thus, the group GB comprises a zone accumulating liquid water and non-reactive species, substantially located at the end of the fluid path. This accumulation zone relates to the produced liquid water and non-reactive species which diffused from the cathode to the anode of the cell group GB, and at least a portion of the produced liquid water and non-reactive species who were transported from group GA in group GB by the fluid flow out of group GA.

As the electrochemical reaction takes place, this accumulation zone has a volume which tends to increase. To reduce or avoid this increase in volume, the drain system D allows fluid evacuation from the group GB to the outlet OUT through the drain channel $D_2$ which connects the output of the last group, here the supply manifold $C_{IN-B}$ to the outlet OUT, the valve $V_{p2}$ being opened to allow fluid to drain out of the group GB. The evacuated fluid therefore has a high concentration in molecular non-reactive species and impurity, and a low molar concentration of reactants. On the side of the anode, the flow rate of fluid flowing into the drain channel $D_2$ is substantially equal to the sum of flow rates of the non-reactive species, essentially nitrogen, having diffused from the cathode to the anode in each of the groups of cells GA and GB. Thus, during a supply phase, the continuous drain of the fluid present in the last group is possible, the volume of the accumulation zone at the end of fluid path remains substantially constant, or increases more slowly than in the example described above.

A supply phase may thus be performed over a longer duration, minimizing the impact of the accumulation zone on the electrochemical performance of the fuel cell battery.

FIG. 5-b illustrates a second supply phase in which the direction of flow in the fluid path is reversed. The valve $V_B$ is opened and the valve $V_A$ is closed, so that group GB is supplied with supply fluid from the inlet IN, without the group GA being supplied. To prevent the supplied hydrogen from being drained through the drain channel $D_2$, the valve $V_{p2}$ is closed. Thus, the supplying fluid is introduced into the group GB from the supply manifold $C_{IN-B}$, and flows down to the common evacuation manifold Cs, by which it is introduced into the group GA. In this example, the fluid path goes from the supply manifold $C_{IN-B}$ to the supply manifold $C_{IN-A}$ via the common evacuation manifold Cs.

Similarly to the previous supply phase, the molar concentration of hydrogen has a negative gradient from a maximum value at the inlet of the fluid path to a minimum value at the outlet of the fluid path. Conversely, because the flow of the supplying fluid which decreases along the fluid path, the molar concentration in produced liquid water and non-reactive species increases. Stoichiometric ratio is well above 1 in group GB, for example greater than 1.2, and very close to 1 in group GA, for example less than 1.1, liquid water and non-reactive species of group GB tend to migrate towards the group GA under the effect of the flow rate. However, in group GA, the output flow rate is insufficient and a liquid water and non-reactive species accumulation zone is formed, located primarily in the end, that is to say at the supply manifold $C_{IN-A}$.

To prevent from an increase of the volume of the accumulation zone as the electrochemical reaction takes place, the drain system D allows fluid evacuation from the group GA in the direction of the outlet OUT. The valve $V_{p1}$ is opened, allowing fluid to flow from the supply manifold $C_{IN-A}$ of group GA to the outlet OUT via a drain channel $D_1$. The evacuated fluid thus comprises a high molar concentration of non-reactive species and impurity, and a low molar concentration of reactive species. On the side of the anode, the flow rate in the drain channel $D_1$ is substantially equal to the sum of flow rates of the non-reactive species, essentially nitrogen, having diffused from the cathode to the anode in each of the groups of cells GA and GB. Thus, during this second supply phase, the continuous drain of the fluid present in the last group GA is possible. The volume of the accumulation zone at the end of fluid path remains substantially constant or increases more slowly than in the example described above. The supply phase may thus be performed over a longer duration, minimizing the impact of the accumulation zone on the electrochemical performance of the fuel cell battery.

The completion of several successive supply phases, in which a first group is supplied, being different from one supply phase to another, as well as the last group(s), permits to transport the accumulation zone from one group to the other, so that the same group operates without a local degradation over time.

Moreover, the alternation of the first supply phase and the second supply phase allows to localize the produced liquid water between the two groups, in the common evacuation manifold $C_s$. Indeed, when the group GA is supplied, the flow of the supplying fluid is sufficient to remove at least partially liquid water out of group GA to the common evacuation manifold $C_s$. When the group GB is supplied, the liquid water located in group GB is at least partly evacuated by the supplying fluid out of the group GB. By this alternating supply phases, the liquid water located in groups GA and GB tends to be localized between the two groups, at the common evacuation manifold $C_s$. A phase separator $P_{sep}$ is advantageously arranged at the common evacuation manifold $C_s$, thereby collecting the liquid water produced during the electrochemical reaction. The volume growth rate of the non-reactive species accumulation zone is reduced or canceled by the presence of the phase separator $P_{sep}$ collecting liquid water. Moreover, purging the fuel cell battery to evacuate the liquid water can be less frequent. The supply phases can last longer and be more numerous between two purge phases.

FIG. 5-c illustrates a purge phase performed between two successive supply phases. This phase might be optional when liquid water is collected from the phase separator $P_{sep}$ and then drained through the latter, allowing to evacuate all or part of the produced liquid water and the non-reactive species, and any impurities. To perform the purge phase, both valves $V_A$ and $V_B$ are opened to supply simultaneously the two groups GA and GB while maintaining the purge valve $V_P$ closed, transporting non-reactive species from the groups to the common evacuation manifold $C_s$. The purge valve $V_p$ is then open, transporting fluids of group GA and GB to the outlet OUT. The fuel cell battery is purged of all or part of the liquid water and non-reactive species in the electrochemical cells.

Alternatively or in addition to the embodiments described above, the drain channel or channels $D_1$, $D_2$ of the drain system D can be dimensioned so that its pressure drop limits the flow rate, for example by comprising a constriction. More generally, a geometrical feature is configured to limit the fluid flow. Thus, only a fraction of the fluid circulating in the last group is removed, limiting the risk of draining a large amount of reactants. For example, the transverse dimensions and/or longitudinal of a drain channel is adapted to limit the fluid flow of a reactant to 5%, preferably less than 1% or even 0.5% of the fluid flow of a reactant in the supplying mean. For a 20 kW fuel cell battery, the supplied hydrogen flow rate is about 13 nm$^3$/h. The targeted purge flow rate is therefore comprised between 65 and 650 nL/h. For a fuel cell battery absolute pressure of 1.5 bar, the diameter of a 20 cm in length drain channel is between 0.2 mm and 1 mm (the equivalent orifice diameter is comprised between 0.05 and 0.3 mm). These values are recalculated based on flow rates and pressures of the considered fuel cell battery.

In this variant, one can avoid the fuel cell battery to comprise drain channel purge valves $V_{p1}$, $V_{p2}$, and to limit the drained hydrogen during the supply of the group connected the drain channel $D_1$, $D_2$. More specifically, with reference to FIG. 5-a, while supplying group GA in the first supply phase, a adapted designed drain channel $D_1$, despite the absence of a purge valve $V_{p1}$, limits the hydrogen flow from the IN towards the supply manifold $C_{IN-A}$ of group GA. The same applies to drain channel $D_2$.

Furthermore, the opening of the valve(s) $V_A$, $V_B$ to supply the first group and the opening of the corresponding drain purge valve $V_{p1}$, $V_{p2}$ may be simultaneous or sequential. Switching devices between the valves $V_A$, $V_B$ can be coupled to the valves $V_{p1}$, $V_{p2}$ (electrically or mechanically), especially when the switching is synchronized. The opening of the purge valve $V_p$ may thus be delayed to await the formation of the accumulation zone, and thus ensure the evacuated fluid has a high molar concentration of non-reactive species. In other words, the evacuation of fluid from a last group can be blocked then permitted by a drain system D.

These additional fluidic lines may simply be implemented in the fuel cell battery, outside of the stack of actual cells. They can also be easily integrated into the cell stack, particularly in the thickness of the end plates. A small diameter of the additional lines and the absence of purge valves $V_{p1}$, $V_{p2}$ enhance the implementation.

The fuel cell battery described above with two groups of cells may include a larger number of cell groups. Groups can then be selectively supplied, for example in a cyclic manner, as described in the patent US2014072896.

Figure 6:
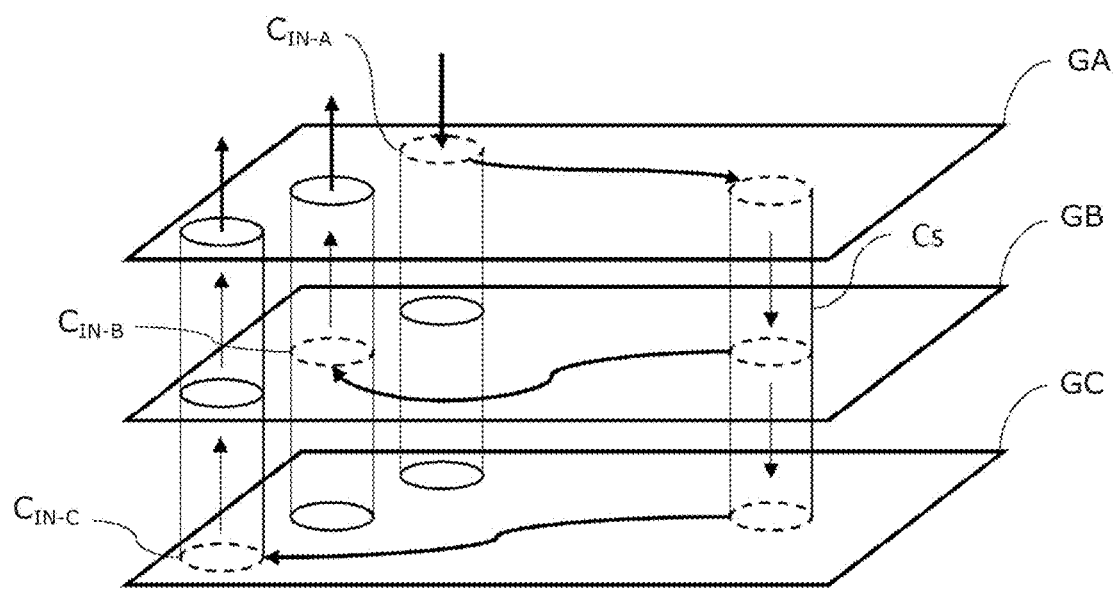

FIG. 6 illustrates a part of a fuel cell battery having three groups of cells GA, GB, GC of which the outlet manifold is common to each group, the supplying fluid injected into the supply manifold $C_{IN-A}$ of the first group GA is connected to common evacuation manifold Cs and can then flow simultaneously in the two groups, from the common evacuation manifold Cs towards the supply manifolds $C_{IN-B}$, $C_{IN-C}$, respectively of the two groups GB and GC. Thus, the first supplied group GA is connected in series with the following two groups GB and GC, also called last groups, which are connected to each other in parallel. A drain system D can be implemented (not shown) to at least one of the last groups or for each of the last groups. The structure of the fuel cell battery is simplified by removing the fluid lines connecting the groups two to two and the valves associated with each of these fluid lines.

To limit the pressure drop, the purge phase is advantageously performed so that the fluid flows in groups GB and GC, in the same direction than in previous (supply) phase. That is to say the direction of the reactant flow in a said last group can be identical in phase chosen between the first (supply) phase and the second (supply) phase and in the third (purge) phase. Thus, there is a flow direction reversal between the supply phase and the purge phase only for the group GA but not for groups GB and GC, leading to a lower local pressure drop than in group GA, limiting its impact on the electrochemical performance of the fuel cell battery.

Alternatively, all the last groups are not necessarily connected to the outlet port via the drain system D, which simplifies the fluidic lines.

Furthermore, the duration of each supply phase and the frequency of alternation between the phases may depend on several criteria, for example the parameters of the battery (output current, temperature), detecting a voltage level of the cell groups in accordance with a predefined threshold and fixed; detecting a voltage of the cell groups in accordance with a predefined threshold varying according to the parameters from the stack (output current, temperature), detecting or estimating the amount of pollutant in the stack. The criteria may be different for each of the feeding stages.

The invention claimed is:

1. A method for supplying a fuel cell battery, comprising at least one stack of cells, with at least one reactant, wherein N groups of cells of the battery, N>1, are selectively supplied with the reactant in at least three phases,
   a) a first phase in which a first group of cells of the N groups of cells is supplied but not a second group of cells of the N groups of cells, the reactant which is unconsumed being able however to flow between the two groups via at least one evacuation manifold connected to the cells of the two groups;
   b) a second phase in which the second group of cells is supplied but not the first group of cells, the reactant which is unconsumed being able however to flow between the two groups via the at least one evacuation manifold; and
   c) a third phase in which the two groups are first supplied simultaneously, then a purge valve of the at least one evacuation manifold is opened then closed.

2. The method of claim 1, wherein cells of the various groups of cells are stacked in an interleaved way in one and a same stack, which is to say that a cell of one group of cells is adjacent to a cell of another group of cells in the stack.

3. The method of claim 1, wherein the first phase and the second phase are repeated in a plurality of successive alternations before the third phase is passed to, after which a cycle restarts.

4. The method of claim 1, wherein N is greater than two and either a single group of cells is supplied during a phase or a plurality, but not all, of the groups of cells are supplied by modifying a composition of the groups of cells supplied during a series of successive phases via a gradual permutation of the supplies, then the third phase is carried out comprising simultaneously opening all the supplies, immediately followed by a common purge via the purge valve.

5. The method of claim 4, wherein a series of phases is repeated a plurality of times before the purge phase.

6. The method of claim 1, wherein the at least one reactant is hydrogen delivered by a supply manifolds to an anode side of the cells of each group.

7. The method of claim 1, wherein the at least one evacuation manifold, passing through the at least one stack of cells, communicates with the cells of all the groups, wherein the said fuel cell comprises an outlet arranged to permit an evacuation of fluids out of the said fuel cell, and a drain system comprising at least a drain channel, said drain channel being arranged between a supply manifold of a group of cells, so-called a last group of cells, communicating with a group of cells which is supplied by the at least one reactant, so-called a supplied group of cells, and wherein a fluid is evacuated through a said drain channel in at least a phase chosen between the first phase a) and the second phase b), the supplied group of cells corresponding to the first group of cells in the first phase and to the second group of cells in the second phase, the last group of cells corresponding to the second group of cells in the first phase and to the first group of cells in the second phase.

8. The method of claim 7, wherein the said drain channel is adapted to limit a reactant flow rate in the said drain channel to at most 5% of a reactant flow rate in a manifold supplying the supplied group of cells.

9. The method of claim 7, in at least a phase chosen between the first phase a) and the second phase b), an evacuation of fluid from the last group of cells, is blocked then permitted by said drain system.

10. The method of claim 7, wherein said drain system allows, in at least a phase chosen between phase a) and phase b), the evacuation of fluid from said last group of cells.

11. The method of claim 7, wherein in at least a phase chosen between phase a) and phase b), circulating liquid water is collected by a phase separator arranged in a fluid path connecting two neighboring groups of cells, preferably connecting said supplied group of cells and a neighboring group of cells.

12. The method of claim 7, wherein a series of phases is repeated a plurality of times before the phase c).

13. The method of claim 7, wherein a direction of the reactant flow in said last group of cells is identical in phase chosen between phase a) and phase b) and in phase c).

* * * * *